Dec. 22, 1936.  J. E. McDOWELL  2,065,011
RECORD BOOK PHOTOGRAPHING APPLIANCE
Filed Sept. 24, 1935  2 Sheets-Sheet 1
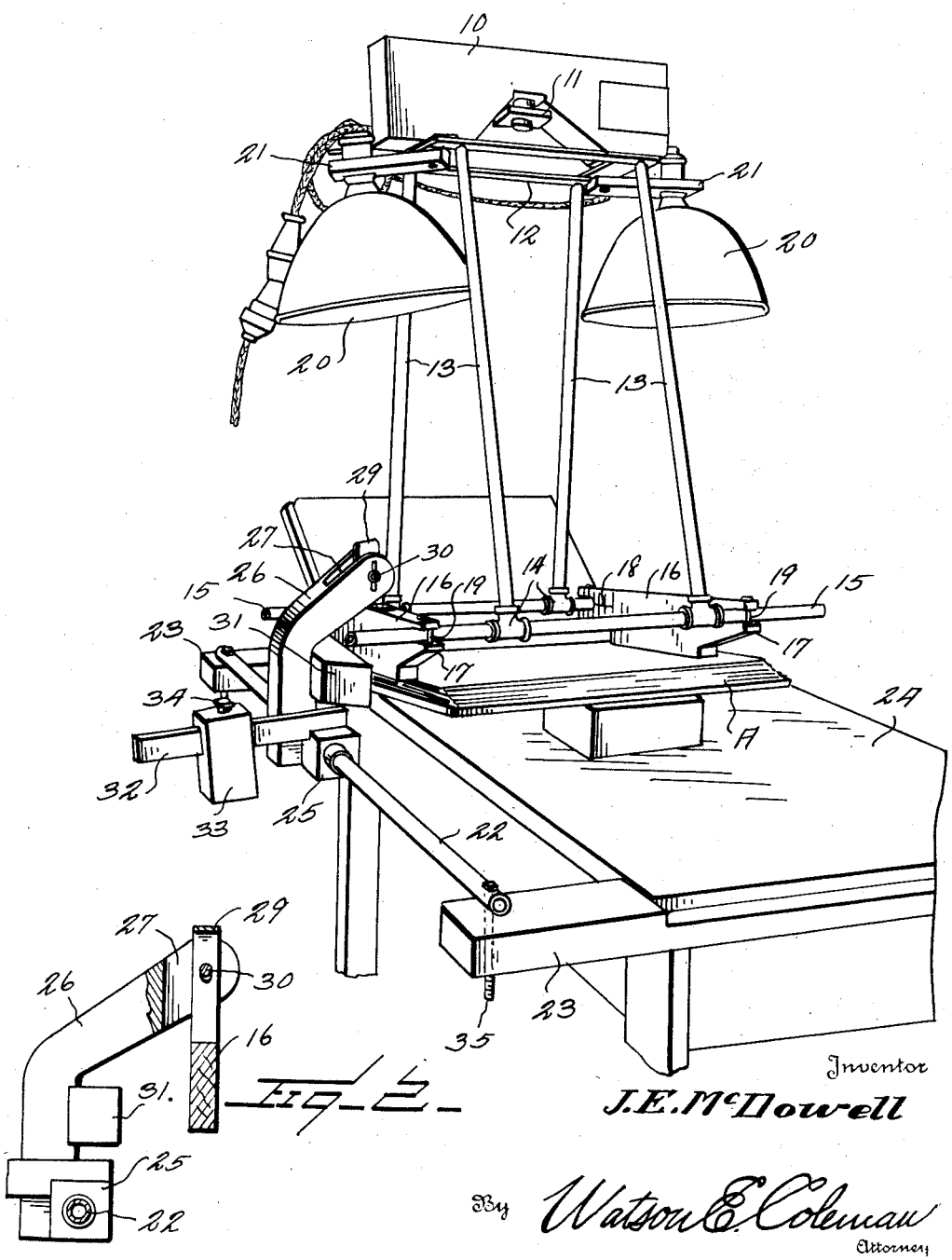
Inventor
J. E. McDowell
By Watson E. Coleman
Attorney Dec. 22, 1936.  J. E. McDOWELL  2,065,011
RECORD BOOK PHOTOGRAPHING APPLIANCE
Filed Sept. 24, 1935   2 Sheets-Sheet 2
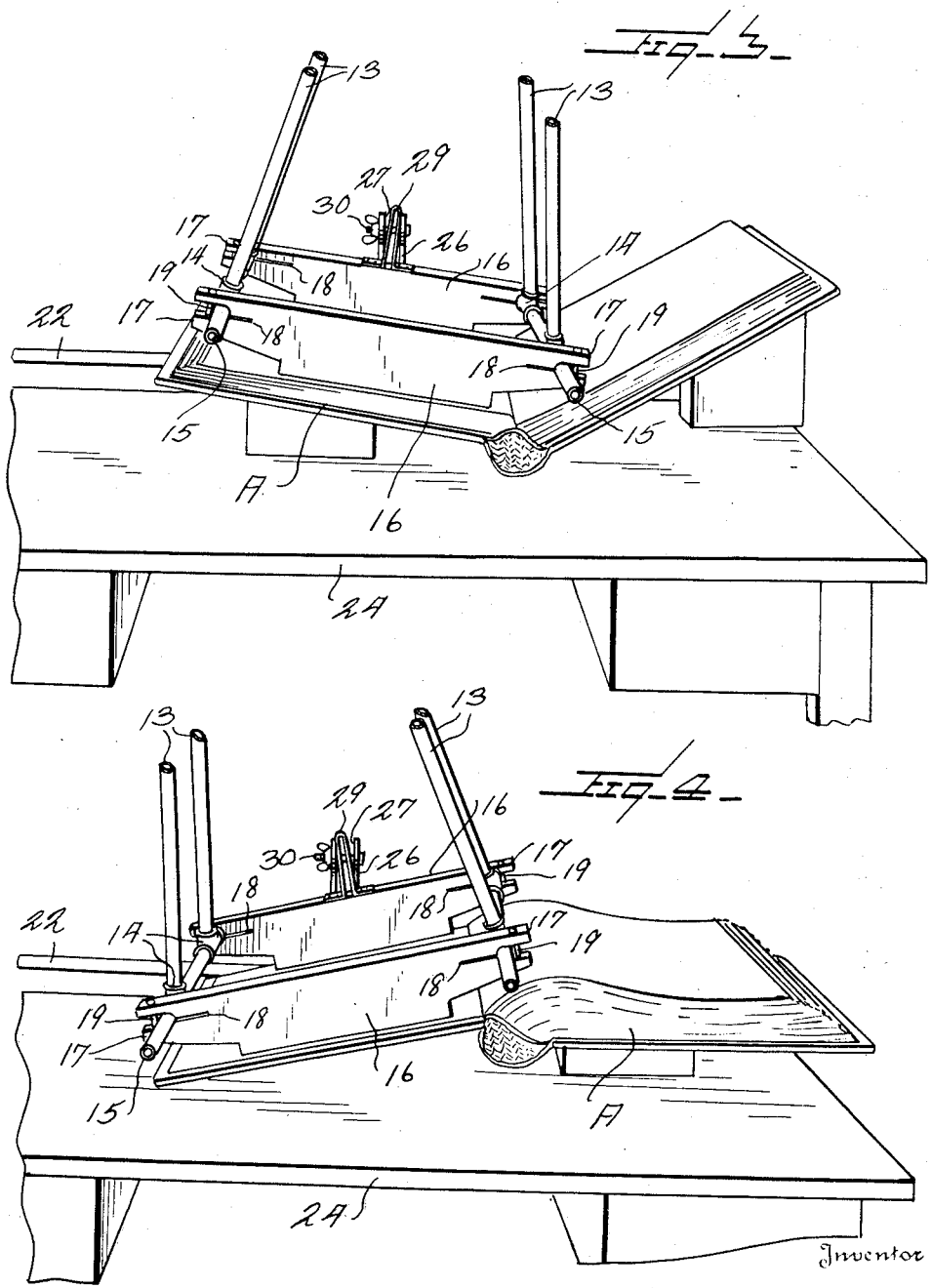
Inventor
J. E. McDowell
By Watson E. Coleman
Attorney Patented Dec. 22, 1936

2,065,011

UNITED STATES PATENT OFFICE 2,065,011

RECORD BOOK PHOTOGRAPHING APPLIANCE

Joe E. McDowell, Woodsboro, Tex., assignor, by mesne assignments, of one-half to Harry P. Wills, Harris County, Tex.

Application September 24, 1935, Serial No. 41,945

8 Claims. (Cl. 88—24)

This invention relates to devices for photographing maps, documents and other papers capable of lying flat, or photographing selected pages from bound volumes which, when opened, do not lie ordinarily in a horizontal plane.

Broadly, one object of my invention is to provide means for photographing the pages of bound volumes regardless of the height of the page from the table on which the volume rests and to this end providing a supporting frame for the camera which at its lower end rests upon the page to be photographed and which is capable of being lifted up and replaced upon any other selected page of the volume without changing the focus of the camera lens.

A further object is to so construct the mechanism that the axis of the lens is always supported perpendicularly to the face of the page or sheet being photographed regardless of any inclination of the page to a horizontal plane and in this connection to provide base supports for the supporting frame of the camera which will hold the page flat against any tendency to curve or bulge, thus fitting the device to be used even with loose-leaf records which, because of the stiff binding column, tends to cause the leaves to curve upward.

A still further object in this connection is to so mount the base supports upon the frame that the base supports may be adjusted toward or from each other to rest upon the transverse upper and lower margins of the page or sheet being photographed to thus hold the sheet or page in a flattened condition without, however, in any way impeding the field of the camera.

A further object is to so support the frame carrying the camera that it may be readily lifted from the open volume being photographed, thus enabling the operator to turn the pages of the volume and replace the machine over and upon any other selected page, and in this connection to provide means for pivotally supporting the frame and counterbalancing the frame to permit it to be readily lifted and shifted.

Still another object is to provide supporting means for the frame which will not only permit the frame to rock in a direction parallel to the front and rear edges of the volume whose page is being photographed, but permit the frame to rock in a direction transverse to the forward and rear edges of the volume so that the frame will accommodate itself to any inclination of the volume and thus support the lens of the camera with its axis perpendicular to the page being photographed.

Still another object is to provide means permitting the supporting frame for the camera to be shifted longitudinally over the book, sheet or map to bring the portion to be photographed within the field of the camera.

Other objects will appear in the course of the following description.

My invention is illustrated in the accompanying drawings wherein:

Figure 1 is a perspective view of my appliance in use, the book being tilted transversely of its length showing the manner in which my appliance accommodates itself to the inclination of the book page;

Figure 2 is a side elevation of the arm which pivotally supports the frame partly broken away, the adjacent rest being in section;

Figure 3 is a perspective view looking from the opposite side of Figure 1;

Figure 4 is a perspective view but showing the appliance applied to a leaf having an opposite inclination to that shown in Figure 1.

Referring to these drawings, 10 designates a casing which at its middle supports the lens barrel or system 11 which is directed downward. This casing is intended to enclose within it two spools, one having therein a roll of unused film and the other being a take-up spool upon which the film may be rolled after the picture is taken. It is to be understood that any suitable casing 10 may be used and that the means for mounting the film, unreeling it, etc., forms no part of my invention. The casing 10 is supported upon a rectangular element designated generally 12, which may be of any suitable construction and which is attached at its corners to the four downwardly extending legs 13, these legs being arranged in pairs and extending downward and laterally. These legs at their lower ends have screw threaded engagement with T's 14, which in turn are connected to the transverse pipe sections 15, which may have any desired length and will, of course, have a length greater than the average length of a bound volume of records designated A in the drawings. Mounted upon the projecting ends of these rods 15 outward of the couplings or T's 14 are the rests or bases 16 which, as illustrated, are of wood, but may be of any suitable material, the ends being forked at 17 and split at 18, the fork embracing a rod 15 and the fork being adapted to be clamped down upon the rod by means of a bolt 19. There will be sufficient elasticity in the wooden fork to cause it to open when the bolt is loosened, thus permitting these rests or bases 16 to be readily shifted along the rods 15 so that these rests or bases will bear against the upper and lower margins of the volume or against a sheet or face of the document being photographed without these rests interfering with the field of the lens.

The frame formed as described may carry upon it any suitable illuminating means as for instance, the downwardly directed reflectors 20 with electric lamps within the reflectors, these reflectors and lamps being supported by any suitable means as, for instance, the arms 21. I do not wish to be limited to the use of lamps or lamps and reflectors or to the particular arrangement of these reflectors and lamps, as any means for illumination suitable for the purpose might be used and the lamps and reflectors omitted entirely, provided there is other suitable means for illumination.

It will be seen that the structure so far described is one in which the supporting frame is open at its lower end and is adapted to rest upon a leaf of a volume or upon the surface of a map or face of a document without regard to the inclination of this page or leaf and that the lens of the camera is always disposed at a fixed distance from the face of the leaf or page being photographed and that the axis of the lens, under these circumstances, will always be perpendicular to the face of the leaf or page being photographed without regard to the inclination of this page. It will likewise be seen that the rests or bases 16 will hold the leaf or page being photographed in a flat condition.

With the structure heretofore described, it would be necessary, in order to turn a page to make a new photograph of any entry, that the supporting frame and the camera be lifted bodily upward. This would involve considerable muscular exertion on the part of the operator and, therefore, it is one of the objects of my invention, as heretofore stated, to so mount this frame that it may be readily raised from the volume being photographed to permit the leaves to be turned and to this end to counterweight this frame. I secure this result by the provision of a longitudinally extending bar 22. This bar is shown as resting upon and being bolted to brackets 23 extending outward from a table 24 upon which the book is supposed to rest. The bar 22 is in parallel relation to one edge of the table and spaced therefrom along nearly its entire length.

Slidably mounted upon the bar 22 is a block 25 which carries upon it and rigidly connected thereto an angular arm 26 which extends upward from the block 25 and then extends upward and inward to a point over the upper edge of one of the rests 16. The upper end of this arm has a relatively wide slot 27. Extending upward from the rest 16 immediately below the extremity of the arm 26 is a vertical member 29 considerably narrower than the slot 28, the upper end of this member being pivoted in the fork or slot 27 by means of the loose wing bolt 30 which passes through a slot in the member 29. Thus the frame has in effect a swivelled connection with the upper end of the arm 27 which permits the frame to swing on the axis afforded by the bolt 30 and to swing in a plane parallel to this axis afforded by the bolt 30. This permits the rests 16 to accommodate themselves to the transverse inclination of the page or sheet being photographed or swing in a plane parallel to the bars 15 to accommodate the frame to a volume which is not transversely flat upon the table 24 but is canted transversely to the table. Thus, though the face of the volume page being photographed varies in its degree of alinement with the table upon which it rests, yet the pivotal or swivelled connection which I have described will permit the frame to be shifted so that the rests 16 will always be in alinement or parallel to the upper and lower edges of the volume or the page of the volume and permits the frame to conform to either a transverse or longitudinal inclination of the volume.

Attached to the inner face of the arm 26 and extending transversely thereof and facing the adjacent rests 16 is a block 31 which confronts and is adapted to bear against the outer face of the adjacent rest 16. Attached to the block 25 and thus to the arm 26 is an outwardly extending beam 32 provided with an adjustable weight 33 held in any adjusted position by a set screw 34. If it be desired to lift the frame off of the volume A and thus permit the leaves of this volume to be turned, the operator who is on the opposite side of the table 24 from the arm 26 pushes inward on the frame, thus causing the arm 26 and the block 25 to turn around the bar 22, the counterbalancing weight 33 assisting in this turning movement. This turning movement lifts the frame upward from the page and tilts it to one side as far as the operator may desire or as far as may be sufficient to permit the turning of the page or pages until another selected page is found whereupon the frame is lowered again into the position shown in Figure 1. The machine is balanced by the weight 33 to such an extent that it requires but little exertion on the part of the operator to raise or lower the frame. The inward pressure given by the operator causes the adjacent member 16 to bear flat against the block 31 so as to form a solid connection between the rest and the block 31 and, of course, the further pressure causes the turning of the arm 26 as heretofore described. When raised away from the face of the volume page, the whole apparatus including the supporting frame, the sheet, the arm, the camera, etc. are all resting on or supported by the bar 22, thus allowing a shifting of the frame longitudinally of the bar 22. The bar 22 may be of any length necessary to permit the movement of the apparatus so that the object or page being photographed will be within the field of the lens. The angular bracket or arm 26 may be of any length or curvature or angle which will enable the frame to be so adjusted as to bring the page of the volume being photographed within the field of the camera lens, it being understood of course, that the distance from the underfaces of the rest 16 to the lens system 11 is a fixed distance which is exactly equal to the focal length of the lens system.

While the arm 26 with its connection to the frame will permit the frame to be lifted to a height equal to the thickness of any ordinary record book so that the first page of the book may be photographed and any page thereafter, yet if books of extraordinary thickness are to be photographed, then the bolt 35 which extends through the bar 22 and through the outwardly projecting arms 23 may be loosened and the bar 22 raised to any extent required by sheaves or blocks, or screws may be provided passing through the arms 23 extending from the table and operatively connected to the bar 22 to raise or lower it. Ordinarily, however, no such adjustment of the bar 22 is necessary or desirable. Inasmuch as the frame with the camera and allied parts weighs about thirty pounds, it will be seen that the counterweight 33 is very necessary.

In the use of this mechanism, the operator sits in front of the table on which is placed the book A or any other object to be photographed having a plane surface. To accomplish this, the apparatus is raised out of its operating position. The opened volume is then placed in position and then a lateral movement either from left to right or right to left is made along the bar 22 until the apparatus reaches such a position that when lowered, the underfaces of the rests 16 will engage against the top and bottom margins of the page. Then by pulling the machine toward the operator, the frame will be brought into the desired position with the underfaces of the rests bearing against the upper and lower margins of the page. Inasmuch as the lens system has a focal distance equal to the distance between the lens system and the lower faces of the rests 16, it follows that the page being photographed will also be in exact focus. The photograph is then made by methods necessary for the particular photographing mechanism mounted upon the frame. When the photograph is made, the operator presses forward upon the apparatus and the apparatus then turns around the center formed by the bar 22, thus raising the frame from the face of the record, and may be then moved either to the right or left, as hereinbefore stated, ready to be brought down on the next succeeding page if this is to be photographed.

An ordinary record volume is from three to four inches thick and contains about six hundred and forty pages. By the use of this apparatus, the operator is enabled to photograph page 1, raise the machine, turn the pages and copy any one of the other six hundred and forty pages without changing the focus of the camera at all. Neither the thickness of the volume nor the difference between the height of the page from the table or the angle at which the pages open in the book makes any difference in the focus of the camera.

While I have illustrated certain details of construction and arrangement of parts which I have found in practice to be particularly effective, I do not wish to be limited to this as obviously many variations might be made in the details of the structure without departing from the spirit of the invention as defined in the appended claims.

What is claimed is:—

1. A photographic appliance including a camera having a lens system and a supporting frame including downwardly extending pairs of legs, transversely extending rods rigidly connected to the lower ends of the legs and a pair of parallel page engaging rests carried upon the transverse rods and adjustable toward or from each other, the distance between the under faces of said rest and the lens system being exactly equal to the focal length of the lens system the rests being upwardly inclined at their ends.

2. A photographic appliance including a camera having a lens system and a supporting frame including downwardly extending pairs of legs, transversely extending rods at the lower ends of the legs, a pair of parallel page engaging rests carried upon the transverse rods and adjustable toward or from each other, the extremities of the rests being forked to embrace the rods, and clamping bolts extending across the forks, the distance between the lens system and the under faces of said rests being exactly equal to the focal length of the lens system.

3. A photographic appliance including a camera having a downwardly directed lens system, a supporting frame for the camera including downwardly and outwardly extending legs, a pair of parallel transverse rods carried by the lower ends of said legs, page engaging rests mounted upon said rods and extending parallel to each other and at right angles to the rods, a table upon which the matter to be photographed is to be disposed, a bar extending parallel to one edge of the table but spaced therefrom, an arm mounted for movement around said bar and extending upward and inward over one of said rests and having a forked upper end, an element mounted upon the upper edge of the last named rest and extending into the forked upper end of the arm, said member having swinging movement in the plane of the arm and swinging movement at right angles to the plane of the arm, a beam extending outward from the arm away from said frame, and a counterweight adjustably mounted upon the beam.

4. A photographic appliance including a camera having a downwardly directed lens system, a supporting frame for the camera including downwardly and outwardly extending members, page engaging rests mounted upon said members and extending parallel to each other, a table upon which the matter to be photographed is to be disposed, a bar extending parallel to one edge of the table but spaced therefrom, an arm mounted for movement around said bar and extending upward and inward over one of said rests and having a forked upper end, an element mounted upon the upper edge of the last named rest and extending into the forked upper end of the arm, said member having swinging movement in the plane of the arm and swinging movement at right angles to the plane of the arm, a beam extending outward from the arm away from said frame, a counterweight adjustably mounted upon the beam, a block carried by the under face of the arm and confronting the outer face of the last named rest and adapted to contact therewith when pressure is applied to the opposite end of the frame to move it toward the arm.

5. A photographic appliance of the character described including a table adapted to support a volume, a page of which is to be photographed, a camera supporting frame above the table, a camera supported on the frame and having a downwardly directed lens system, rests carried by the frame and adapted to engage the upper and lower margins of a page of said volume and means engaging the table for supporting the frame and permitting it to be shifted nearer to or further from the table, said means permitting the frame to be inclined parallel to the length of the table or transversely of the table, said means having pivotal engagement with the table for swinging movement in a vertical plane transversely of the table whereby to permit the frame to be lifted away from the volume being photographed.

6. A photographic appliance of the character described, including a table adapted to support a volume, a page of which is to be photographed, a camera supporting frame above the table, a camera supported on the frame and having a downwardly directed lens system, rests carried by the frame and adapted to engage the upper and lower margins of a page of said volume, means connected to the frame and having pivotal engagement with the table for swinging movement in a vertical plane transversely of the table whereby to permit the frame to be lifted away from the volume being photographed, and a connection between the frame and said means permitting the frame to be inclined with reference to the table.

7. A photographic appliance of the character described, including a camera having a downwardly directed lens system, a supporting frame for the camera including downwardly extending members and page engaging rests carried thereby, a table on which the material to be photographed is to be disposed, an arm operatively pivoted to the table and extending upward and inward over the table and pivotally connected to said frame, and a member carried by the under face of the arm and confronting the adjacent rest and with which the rest engages when pressure is applied to the frame to move it toward the arm, whereby the arm and frame may have unitary turning movement upon the pivot of the arm to carry the camera and its frame out of position over the table.

8. A photographic appliance, including a camera having a downwardly directed lens system and a supporting frame for the camera open at its lower end, the frame at its lower end having two parallel page engaging rests, a table upon which the matter to be photographed is placed, a rod supported upon the table in spaced relation to one edge thereof but parallel to said edge, an arm pivoted to one of said rests and through which the rod passes, the arm being rotatable in one plane upon said rod and having sliding engagement with the rod for movement longitudinally of the rod.

JOE E. McDOWELL.